United States Patent
Kohda et al.

(10) Patent No.: US 12,448,317 B2
(45) Date of Patent: Oct. 21, 2025

(54) METHOD OF MANUFACTURING OPTICAL FIBER AND APPARATUS FOR MANUFACTURING OPTICAL FIBER

(71) Applicant: SUMITOMO ELECTRIC INDUSTRIES, LTD., Osaka (JP)

(72) Inventors: Hiroshi Kohda, Osaka (JP); Takaharu Sato, Osaka (JP); Katsuyuki Tsuneishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 148 days.

(21) Appl. No.: 18/212,282

(22) Filed: Jun. 21, 2023

(65) Prior Publication Data
US 2023/0416140 A1    Dec. 28, 2023

(30) Foreign Application Priority Data
Jun. 23, 2022  (JP) ................ 2022-100988

(51) Int. Cl.
  C03B 37/025   (2006.01)
  C03C 25/104   (2018.01)

(52) U.S. Cl.
  CPC ...... *C03B 37/0253* (2013.01); *C03B 37/0256* (2013.01); *C03C 25/104* (2013.01); *C03B 2203/16* (2013.01); *C03B 2205/20* (2013.01)

(58) Field of Classification Search
  CPC ............................................. C03B 37/0253
  See application file for complete search history.

(56) References Cited

U.S. PATENT DOCUMENTS

2011/0132037 A1    6/2011  Ishida et al.

FOREIGN PATENT DOCUMENTS

| JP | 2009007201 A | * | 1/2009 | ......... C03B 37/0253 |
| JP | 2010-145288 A |   | 7/2010 | |
| JP | 2013-112551 A |   | 6/2013 | |
| WO | WO-2010/116762 A1 | | 10/2010 | |

OTHER PUBLICATIONS

Translation of JP 2009-7201 (Year: 2009).*

* cited by examiner

*Primary Examiner* — Cynthia Szewczyk
(74) *Attorney, Agent, or Firm* — Faegre Drinker Biddle & Reath LLP

(57) ABSTRACT

A method of manufacturing an optical fiber with a hole from a preform having a through hole is disclosed. The manufacturing method includes placing a preform in a drawing furnace, forming an optical fiber by melting and drawing the preform in the drawing furnace while a gas is introduced into the through hole, capturing an image of the optical fiber drawn from the preform, and measuring a hole diameter of the optical fiber based on an image captured in the capturing of the image and controlling a pressure of the gas introduced into the through hole based on a measurement result. In the capturing of the image, when the optical fiber deviates, a predetermined countermeasure is taken to make the image clear, and the image is maintained in a clear state.

8 Claims, 9 Drawing Sheets

METHOD OF MANUFACTURING OPTICAL FIBER AND APPARATUS FOR MANUFACTURING OPTICAL FIBER

CROSS-REFERENCE TO RELATED APPLICATION

This application claims the benefit of priority from Japanese Patent Application No. 2022-100988, filed on Jun. 23, 2022, the entire content of which is incorporated herein by reference.

TECHNICAL FIELD

The present disclosure relates to a method of manufacturing an optical fiber and an apparatus for manufacturing an optical fiber.

BACKGROUND

JP2013-112551A discloses a method of manufacturing an optical fiber with a hole formed therein by drawing a preform while gas is introduced into a through hole. In the method of manufacturing an optical fiber, while the optical fiber is being manufactured, a hole diameter of the optical fiber drawn from the preform is measured, and a pressure of the gas introduced into the through hole is determined based on a measurement result. This optical fiber manufacturing apparatus indirectly measures the hole diameter of the optical fiber.

JP2010-145288A discloses a measuring method in which a capacitance of an optical fiber is measured and a hole diameter of an optical fiber with a hole is calculated based on the measured value using the correlation between the capacitance and the hole diameter obtained by actual measurement in advance. WO2010/116762 discloses a measuring method in which an optical fiber is continuously irradiated with collimated light beams, and a hole diameter is calculated using a correlation between a scattering intensity pattern of forward scattered light generated by the irradiation and the hole diameter.

SUMMARY

A method of manufacturing an optical fiber according to one embodiment of the present disclosure is a method of manufacturing an optical fiber with a hole from a preform having a through hole. The method of manufacturing an optical fiber includes placing a preform in a drawing furnace, forming an optical fiber by melting and drawing the preform in the drawing furnace while a gas is introduced into the through hole, capturing an image of the optical fiber, and measuring a hole diameter of the optical fiber based on an image captured in the capturing of the image and controlling a pressure of the gas introduced into the through hole based on a measurement result. In the capturing of the image, when the optical fiber deviates, a predetermined countermeasure is taken to make the image clear, and the image is maintained in a clear state.

An apparatus for manufacturing an optical fiber according to one embodiment of the present disclosure is an apparatus for manufacturing an optical fiber with a hole from a preform having a through hole. The apparatus for manufacturing an optical fiber includes a drawing furnace configured to place a perform therein, an application device configured to apply a pressure by introducing a gas into the through hole, an image capturing device configured to capture an image of the optical fiber, a measuring unit configured to measure a hole diameter of the optical fiber based on the image captured by the image capturing device, and a controller configured to control injection of the gas into the through hole by the gas pressure application device, based on a measurement result of the measuring unit. The image capturing device includes a mechanism that takes a predetermined countermeasure to make the image clear and maintains the image in a clear state, when the optical fiber deviates.

DETAILED DESCRIPTION

Figure 1:
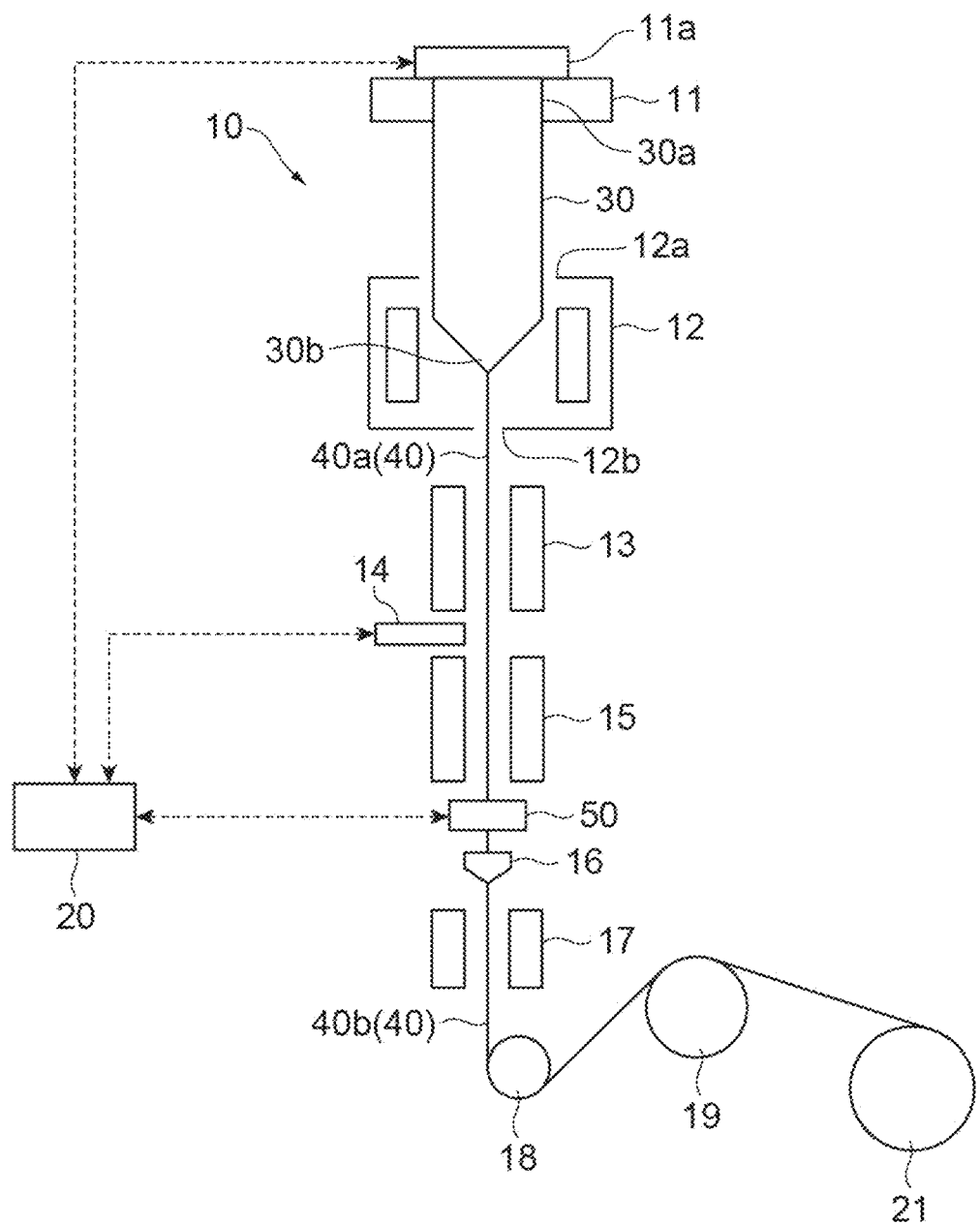
FIG. 1 is a diagram showing a configuration of a drawing apparatus used in a method of manufacturing an optical fiber according to one embodiment.

In the method of manufacturing an optical fiber disclosed in JP2013-112551A, although the hole diameter of the optical fiber is measured indirectly, it is desirable to directly measure the hole diameter of the optical fiber in order to measure the hole diameter with higher accuracy. However, it is difficult to directly measure the hole diameter with high accuracy because the optical fiber may deviate inside an apparatus for manufacturing the optical fiber. For example, since the optical fiber may vibrate inside the apparatus, an image of the optical fiber may be captured in a vibrated state when the image of the optical fiber is directly captured using an image capturing device. Further, for example, when the optical fiber is manufactured continuously for a long period of time, the optical fiber may deviate from an initial position thereof inside the apparatus, and the optical fiber may become blurred in the captured image. From the above, it is desired to continue to measure the hole diameter directly and accurately.

According to the present disclosure, it is possible to continuously and directly measure the hole diameter of the optical fiber with high accuracy.

DESCRIPTION OF EMBODIMENTS OF THE PRESENT DISCLOSURE

First, the contents of the embodiments of the present disclosure will be listed and described.

(1) A method of manufacturing an optical fiber according to one embodiment of the present disclosure is a method of manufacturing an optical fiber with a hole from a preform having a through hole. The method of manufacturing an optical fiber includes placing a preform in a drawing furnace, forming an optical fiber by melting and drawing the preform in the drawing furnace while a gas is introduced into the through hole, capturing an image of the optical fiber, and measuring a hole diameter of the optical fiber based on an image captured in the capturing of the image and controlling a pressure of the gas introduced into the through hole based on a measurement result. In the capturing of the image, when the optical fiber deviates, a predetermined countermeasure is taken to make the image clear, and the image is maintained in a clear state.

In the method of manufacturing an optical fiber, even when the optical fiber deviates, out-of-focus, vibration, or the like, which cause an image to be unclear in the captured image of the optical fiber, are curbed, and thus the image captured through the optical fiber can be maintained in a clear state. Therefore, it is possible to continuously and directly measure the hole diameter of the optical fiber with high accuracy based on the image.

(2) As one embodiment, in the method of (1), in the capturing of the image, a predetermined countermeasure when the optical fiber deviates may be taken by continuing to focus on the position of the optical fiber. In this case, when the optical fiber has been manufactured over a long period of time and the position of the optical fiber is shifted from a focus of a camera used for capturing an image, it is possible to curb blurring of the optical fiber due to deviation of the optical fiber. Thus, it is possible to curb occurrence of out-of-focus, which causes the image to become unclear, in the captured image.

(3) As one embodiment, the method of (1) or (2) may include forming a protective coating on an outer circumference of the optical fiber immediately after the capturing of the image. In this case, since the position of the optical fiber is fixed when the protective coating is formed immediately after the capturing of the image, it is possible to perform image capturing in a state in which the deviation of the optical fiber is curbed. Therefore, it is possible to curb the occurrence of vibration, which causes the image to become unclear, in the captured image.

(4) As one embodiment, in the method of any one of (1) to (3), in the capturing of the image, a predetermined countermeasure when the optical fiber deviates may be taken by irradiating the optical fiber with illumination for a predetermined period of time, and capturing the image at a timing of irradiation. In this case, since the illumination is applied for a predetermined period of time, and the image is captured at the timing of the irradiation, for example, when high-speed exposure is performed in an image capturing device, the effect of vibration of the optical fiber can be reduced in the captured image. In a captured image, it is possible to curb an influence of vibration which causes the image to be unclear.

(5) As one embodiment, in the method of (4), the predetermined period of time may be $5.0 \times 10^{-5}$ seconds or more and $1.0 \times 10^{-3}$ seconds or less. In this case, it is possible to more reliably reduce the influence of the vibration of the optical fiber on the captured image. Thus, it is possible to make the captured image clearer.

(6) As one embodiment, in the method of any one of (1) to (5), the hole in the optical fiber may include a plurality of holes. In the capturing of the image, one of the plurality of holes may be captured in a plurality of directions. In this case, when the image of the optical fiber is captured from a certain direction, even though a hole overlaps a core of the optical fiber and cannot be captured well, it is possible to capture the hole from another direction. Thus, it is possible to measure each of hole diameters in the optical fiber with higher accuracy.

(7) An apparatus for manufacturing an optical fiber according to one embodiment of the present disclosure is an apparatus for manufacturing an optical fiber with a hole from a preform having a through hole. The apparatus for manufacturing an optical fiber includes a drawing furnace configured to place a preform, an application device configured to apply a pressure by injecting a gas into the through hole, an image capturing device configured to capture an image of the optical fiber, a measuring unit configured to measure a hole diameter of the optical fiber based on the image captured by the image capturing device, and a controller configured to control a pressure of the gas into the through hole by the application device, based on a measurement result of the measuring unit. The image capturing device includes a mechanism that takes a predetermined countermeasure to make the image clear and maintains the image in a clear state, when the optical fiber deviates.

In the apparatus for manufacturing an optical fiber, even when the optical fiber deviates, out-of-focus, vibration, and the like, which cause the image obtained by capturing the optical fiber to become unclear, are curbed. Therefore, it is possible to maintain an image of the optical fiber in the clear state. Thus, it is possible to continuously and directly measure the hole diameter of the optical fiber with high accuracy based on the image.

DETAILS OF THE EMBODIMENT OF THE PRESENT DISCLOSURE

An embodiment of the present disclosure will be described in detail below with reference to the accompanying drawings. The present disclosure is not limited to these exemplifications, but is indicated by the scope of the claims, and is intended to include all modifications within the meaning and scope of equivalents of the scope of the claims. In the following description, the same reference numerals will be used for the same elements or elements having the same functions, and redundant description will be omitted.

(Apparatus for Manufacturing Optical Fiber)

A drawing apparatus 10 used in a method of manufacturing an optical fiber according to one embodiment will be described with reference to FIGS. 1 to 3. FIG. 1 is a configuration diagram of a drawing apparatus used in the method of manufacturing an optical fiber according to one embodiment. As shown in FIG. 1, the drawing apparatus 10 includes a gripping mechanism 11, a drawing furnace 12, a measuring device 14, a cooler 15, an image capturing device 50, a die 16, an ultraviolet (UV) irradiation device 17, a direct-type guide roller 18, a capstan 19, a winder 21 and a control device 20. A heat retaining furnace 13 may be provided between the drawing furnace 12 and the cooler 15. In the drawing apparatus 10, an optical fiber 40 is formed by drawing a preform 30 disposed on the gripping mechanism 11.

Figure 2A:
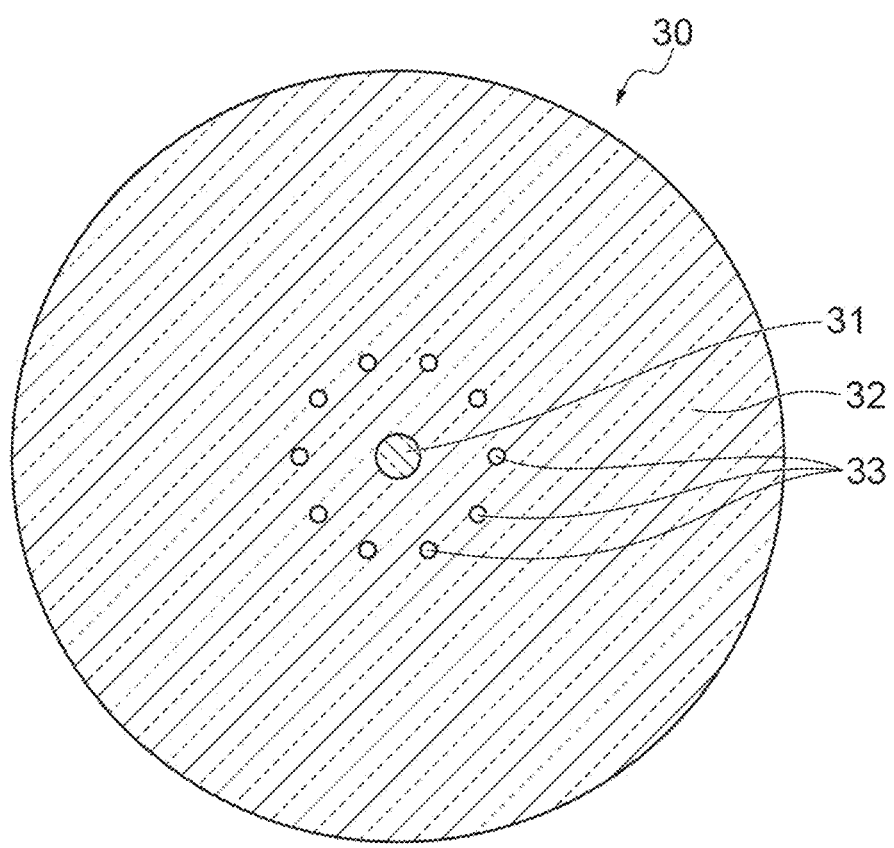
FIG. 2A is a diagram showing an example of a cross-sectional structure of a preform.
Figure 2B:
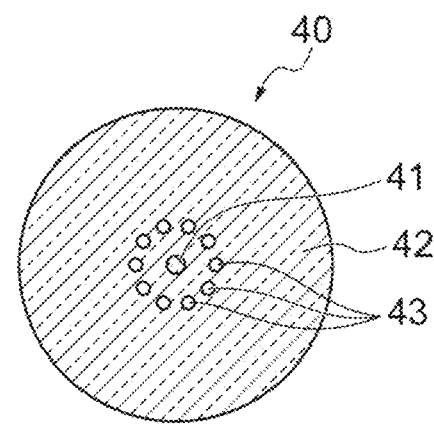
FIG. 2B is a diagram showing an example of a cross-sectional structure of an optical fiber.

FIG. 2A is a diagram showing a cross-sectional structure of the preform 30. FIG. 2B is a diagram showing a cross-sectional structure of the optical fiber 40. As shown in FIG. 2A, the preform 30 includes a core 31, a cladding 32 surrounding the core 31, and a plurality of through holes 33 formed inside the cladding 32. Each of the core 31 and the cladding 32 is made of glass, for example. The plurality of through holes 33 extend in an axial direction of the preform 30. The plurality of through holes 33 are provided, for example, at regular intervals on a circumference around the core 31. A cross-section of the plurality of through holes 33 is circular, for example.

As shown in FIG. 2B, the optical fiber 40 includes a core 41, a cladding 42 surrounding the core 41, and a plurality of holes 43 formed inside the cladding 42. Each of the core 41 and the cladding 42 is made of glass, for example. The plurality of holes 43 extend in the axial direction of the optical fiber 40. The plurality of holes 43 are provided, for example, at regular intervals on a circumference around the core 41. A cross section of the plurality of holes 43 is circular, for example. Although the number of through holes 33 in the preform 30 and the number of holes 43 in the optical fiber 40 are ten in FIG. 2B, they are not limited thereto. Such an optical fiber 40 is called a hole-assisted fiber (HAF).

When the preform 30 is drawn to form the optical fiber 40, a cross-sectional structure of the optical fiber 40 is similar to a cross-sectional structure of the preform 30. At this time, the core 31, the cladding 32 and the plurality of through holes 33 become the core 41, the cladding 42 and the plurality of holes 43, respectively, by drawing the preform 30.

The gripping mechanism 11 is a member for gripping the preform 30 and feeding it into the drawing furnace 12 at a constant speed. The preform 30 has a proximal end portion 30a and a distal end portion 30b. The proximal end portion 30a is gripped by the gripping mechanism 11. The distal end portion 30b is inserted inside the drawing furnace 12. The gripping mechanism 11 functions as a supplier that supplies the preform 30 to the drawing furnace 12.

A gas pressure application device 11a is provided at the gripping mechanism 11. The gas pressure application device 11a introduces a gas into the through holes 33 of the preform 30 disposed in the gripping mechanism 11 and applies a pressure. The gas pressure application device 11a applies a gas pressure to the through holes 33 while the preform 30 is being drawn. Thus, the through holes 33 remain as holes 43 inside the optical fiber 40 without being crushed when the preform 30 is drawn.

The drawing furnace 12 has an opening 12a into which the preform 30 is inserted and an opening 12b facing the opening 12a. The drawing furnace 12 heats and melts (softens) the distal end portion 30b of the preform 30 supplied into the drawing furnace 12. A glass fiber-like optical fiber 40a is pulled out of the distal end portion 30b melted by heating. The glass fiber-like optical fiber 40a is pulled out of the drawing furnace 12 through the opening 12b.

The heat retaining furnace 13 keeps the glass fiber-like optical fiber 40a warm and relaxes a structure of glass. The measuring device 14 measures an outer diameter of the optical fiber 40a (an outer diameter of the glass) in which the structure of the glass is relaxed. The measuring device 14 measures the glass outer diameter by irradiating the optical fiber 40a with a laser, for example. The measuring device 14 transmits the measured outer diameter of the glass to the control device 20. The measuring device 14 may detect a position of the optical fiber 40a. In this case, the measuring device 14 may transmit a signal indicating the position to the control device 20. The cooler 15 is disposed behind the measuring device 14 and cools the glass fiber-like optical fiber 40a.

The image capturing device 50 is a device that captures an image of the optical fiber 40. The image capturing device 50 is disposed behind the cooler 15 and transmits the image obtained by capturing the optical fiber 40 to the control device 20. The die 16 is disposed behind the image capturing device 50. The image capturing device 50 is disposed close to the die 16, for example, directly above the die 16. The die 16 is a device that applies a resin to the optical fiber 40a, as will be described later. The die 16 restricts movement of the optical fiber 40a in a radial direction. For this reason, the image capturing device 50 may be disposed as close to the die 16 as possible. The image capturing device 50 may be disposed, for example, so that a distance from the die 16 is 30 cm or less. The image capturing device 50 may be disposed so that the distance from the die 16 is 10 cm or less.

The die 16 applies a resin to an outer peripheral surface of the input glass fiber-type optical fiber 40a to form a coating resin. The resin includes an acrylate-based UV-curable resin. The UV irradiation device 17 irradiates the coating resin applied to the optical fiber 40a with UV rays to cure the coating resin. Thus, a resin-coated optical fiber 40b is formed by coating the glass fiber with a resin. The optical fiber 40b is sent to the capstan 19 by the direct-type guide roller 18. The capstan 19 pulls the optical fiber 40b at a predetermined speed and tension. The winder 21 winds the optical fiber 40b pulled by the capstan 19.

The control device 20 acquires an image of the optical fiber 40a from the image capturing device 50. The control device 20 measures a hole diameter of the optical fiber 40a by image processing based on the acquired image. The control device 20 controls the gas pressure application device 11a based on the measured hole diameter. The control device 20 receives the outer diameter of the glass measured by the measuring device 14 from the measuring device 14, and controls the winder 21 and the like based on the outer diameter of the glass. The control device 20 may control the drawing apparatus 10 as a whole.

Figure 8:
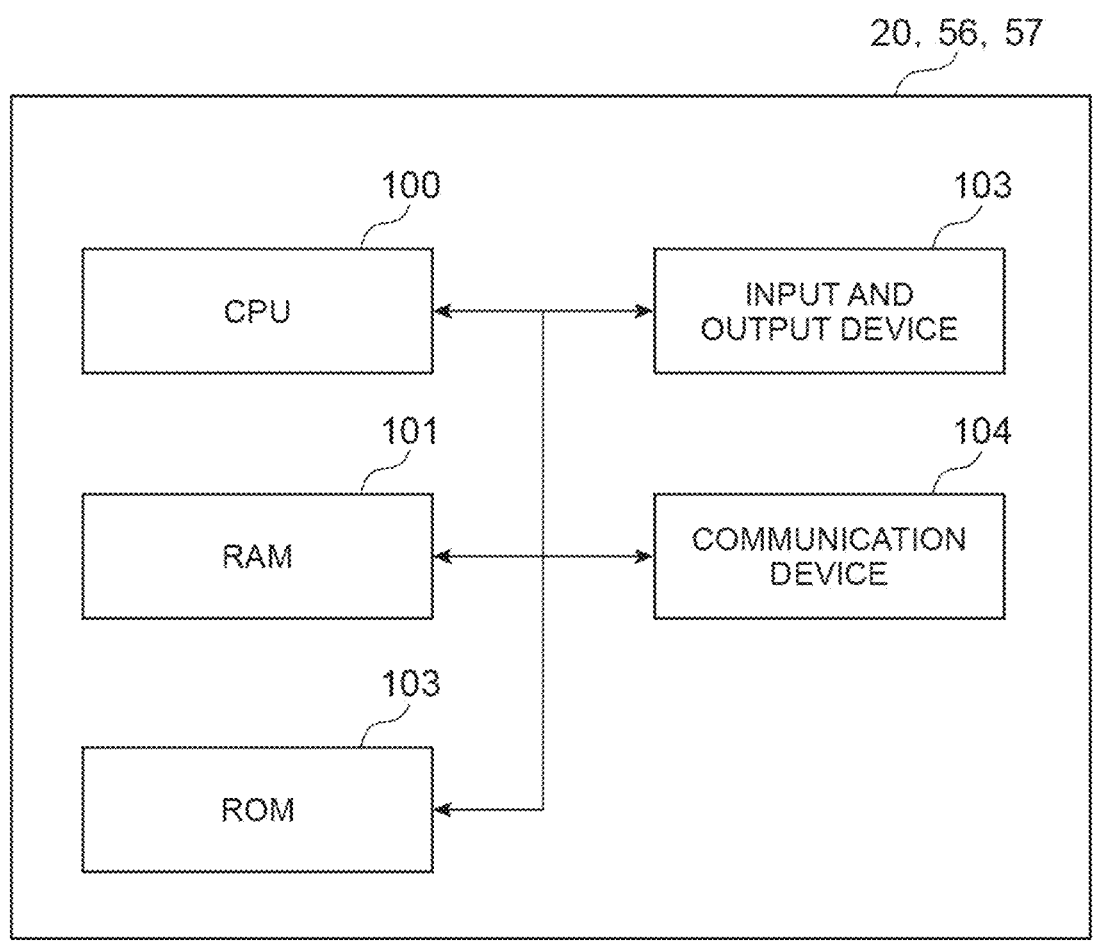
FIG. 8 is an example of a hardware configuration of the control device in FIG. 1.

FIG. 8 is an example of a hardware configuration of the control device 20. As shown in FIG. 8, the control device 20 may be configured as a computer system including a processor such as a central processing unit (CPU) 100, a memory such as a random access memory (RAM) 101 and a read only memory (ROM) 102, an input and output device 103 such as a touch panel, a mouse, a keyboard, a display, and a communication device 104 such as a network card. The control device 20 realizes functions of the control device 20 by operating each piece of hardware under control of the processor based on a computer program stored in the memory.

(Configuration of Image Capturing Device 50)

Figure 3:
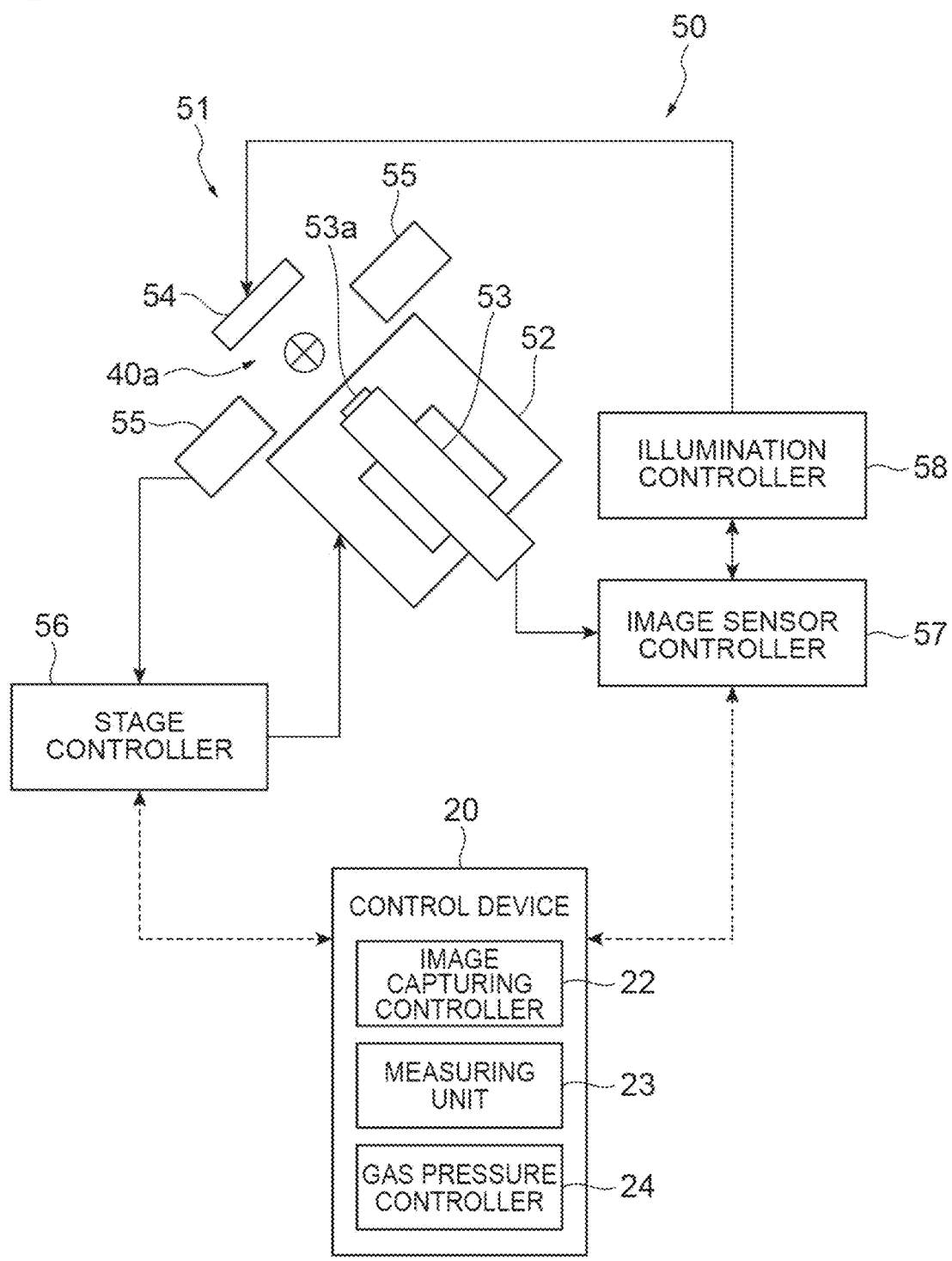
FIG. 3 is a schematic configuration diagram of a control device and an image capturing device of the drawing apparatus of FIG. 1.

FIG. 3 is a schematic diagram showing a configuration of the control device 20 and the image capturing device 50. Specifically, the image capturing device 50 has an optical head 51 that captures an image of the optical fiber 40a. The optical head 51 includes a stage 52, a camera 53 disposed on the stage 52, and an illuminator 54 that irradiates the optical fiber 40a with illumination.

The stage 52 extends, for example, on a plane perpendicular to a running direction of the optical fiber 40a, and is configured to be movable on the plane. The stage 52 is, for example, a rectangular plate. Movement of the stage 52 is controlled by a stage controller 56.

The camera 53 is fixed on the stage 52. The camera 53 captures an image of the optical fiber 40a and transmits the captured image to an image sensor controller 57. The camera 53 may be, for example, a line sensor or an area sensor capable of acquiring images at a high image capturing frequency. The camera 53 is, for example, a charge coupled device (CCD) image sensor or a complementary MOS (CMOS) image sensor. The camera 53 captures the image of the optical fiber 40a at the image capturing frequency obtained from the image sensor controller 57. The capturing frequency is set by the control device 20, and for example, in the case of the area sensor, it may be 1 to 50 times per second, for example, 5 times/second. In the case of the line sensor, it may be 100 to 100,000 times per second, for example 1000 times/second. The camera 53 may be exposed for, for example, a time during which the illumination is emitted from the illuminator 54 in one image capturing.

The camera 53 has an objective lens 53a. A magnification of the objective lens 53a may be, for example, 2 times or more and 100 times or less, or may be 5 times or more and 40 times or less, or may be, for example, 20 times. A focal length of the objective lens 53a may be 5 mm or more and 50 mm or less, or may be 10 mm or more and 30 mm or less, and is, for example, 20 mm A width of an image element of the camera is, for example, 3 µm or more and 10 µm or less.

The image capturing device 50 includes a pair of detectors 55, the stage controller 56 and the image sensor controller 57. The pair of detectors 55 are disposed to face each other with the optical fiber 40a interposed therebetween. The stage controller 56 controls movement of the stage 52. The image sensor controller 57 controls the camera 53. An illumination controller 58 controls the illuminator 54. The image sensor controller 57 and the illumination controller 58 are configured to communicate with each other. As shown in FIG. 8, the stage controller 56 and the image sensor controller 57 may have the same hardware configuration as the control device 20.

The illuminator 54, for example, faces the camera 53 with the optical fiber 40a interposed therebetween. The illuminator 54 irradiates the optical fiber 40a with illumination for a predetermined period of time. The predetermined period of time is also an exposure time of the camera 53, and may be, for example, $5.0 \times 10^{-5}$ seconds or more and $1.0 \times 10^{-3}$ seconds or less, $2.0 \times 10^{-4}$ seconds or more and $8.0 \times 10^{-4}$ seconds or less, and for example, $5.0 \times 10^{-4}$ seconds. The predetermined period of time is set by the illumination controller 58. The illuminator 54 may be a transmissive illumination, such as a laser, a flash lamp, and a light emitting diode (LED), that can emit light only for the predetermined period of time. The illuminator 54 may be a device that emits light having a short wavelength. Thus, image capturing with higher resolution is enabled. The illuminator 54 may be planar (diffuse) illumination rather than focused (parallel) illumination. As a result, in the image captured by the camera 53, a bright background can be obtained over the entire interior of the optical fiber 40a.

The detector 55 is a sensor that detects the position of the optical fiber 40a when the optical fiber 40a runs. The detector 55 detects the position of the optical fiber 40a on a plane perpendicular to the direction in which the optical fiber 40 runs. The detector 55 transmits the detected position to the stage controller 56. The detector 55 may be any sensor capable of detecting the position of the optical fiber 40a, such as a line position sensor or an outer diameter measuring device.

The stage controller 56 moves the stage 52 according to a change in the position of the optical fiber 40a detected by the detector 55 when the preform 30 is drawn. Specifically, when the drawing of the preform is started, the stage controller 56 acquires initial position data of the optical fiber 40a from the detector 55 and transmits it to the control device 20. The stage controller 56 acquires the initial position data of the stage 52 set by the control device 20 from the control device 20 and moves the stage 52 to the initial position. The stage controller 56 acquires position data of the optical fiber 40a from the detector 55 while the preform 30 is being drawn, and acquires difference data between the position of the optical fiber 40a and the initial position. The stage controller 56 changes a position of the stage 52 by the difference. That is, a separation distance between the optical fiber 40a and the camera 53 is kept constant. Here, since the initial position of the stage 52 is set so that the camera 53 is focused on the optical fiber 40a (which will be described below), even when the optical fiber 40a deviates, the camera 53 is focused on the optical fiber 40a. In this way, the image capturing device 50 includes a mechanism for taking a predetermined countermeasure and maintaining a clear image when the optical fiber deviates.

The "clear state of the image" referred to here means a state in which a difference in brightness, chroma of a color, and the like, representing a shape of an imagined object is greatly obtained according to vertical and horizontal positions in an image (a difference in brightness between the brightest and darkest portions of the image is large). The state generally means a state in which contrast is high. A clear image is obtained when the object is near a focal position of the camera (that is, the camera is focused on the object), and when a position of the object changes little during acquisition of a single image (that is, the position of the object does not vibrate from a position at the time when the camera starts image capturing).

The image sensor controller 57 acquires image capturing frequency data for the camera 53 from the control device 20 and outputs the data to the camera 53. The image sensor controller 57 transmits image data acquired from the camera 53 to the control device 20. The image sensor controller 57 acquires from the control device 20 data on the time when the illuminator 54 emits illumination, and outputs the data to the illumination controller 58. The illumination controller 58 controls the illuminator 54 so that the illuminator 54 emits illumination for an irradiation time corresponding to the acquired time data. The image sensor controller 57 outputs image data acquired from the camera 53 to an external display or electronic chart. The display and electronic chart display the image data.

(Configuration of Control Device 20)

The control device 20 includes an image capturing controller 22, a measuring unit 23, and a gas pressure controller 24, as shown in FIG. 3. The image capturing controller 22 controls image capturing in the image capturing device 50. The measuring unit 23 measures a hole diameter of the optical fiber 40a based on the image captured by the image capturing device 50. The gas pressure controller 24 controls the gas pressure application device 11a based on a measurement result by the image sensor controller 57. The control device 20 is configured to communicate with the stage controller 56 and the image sensor controller 57.

The image capturing controller 22 sets the image capturing frequency in the optical head 51 as image capturing frequency data, and transmits the image capturing frequency data to the image sensor controller 57. The image capturing controller 22 sets a time during which the illuminator 54 emits illumination as time data, and transmits the time data to the image sensor controller 57. The image capturing controller 22 acquires initial position data of the optical fiber 40a from the stage controller 56. The image capturing controller 22 determines a position separated by a focal length of the camera 53 from the obtained initial position of the optical fiber 40a as the initial position of the stage 52, and transmits the determined initial position data to the stage controller 56. When the stage controller 56 moves the stage 52 to the initial position, focusing in the image capturing device 50 is performed. The image capturing controller 22 may calculate the initial position of the optical fiber 40*a* from a signal indicating the position of the optical fiber 40*a* received from the measuring device 14.

The measuring unit 23 measures the hole diameter of the optical fiber 40*a* based on the image data acquired from the image capturing device 50. Specifically, first, the measuring unit 23 recognizes an outline of the optical fiber 40*a* in the image captured by the image capturing device 50. Next, the measuring unit 23 recognizes a contour line of the hole of the optical fiber 40*a* in the image. When there are a plurality of holes, the focus should be on the contour line of one of them. Subsequently, the measuring unit 23 calculates a diameter of the hole from the contour line of the hole of the optical fiber 40*a* as the hole diameter of the optical fiber 40*a*. Subsequently, the measuring unit 23 calculates a movement average, a maximum value, and a minimum value of last 10 calculation results of the hole diameter of the optical fiber 40*a*. Finally, the measuring unit 23 transfers the movement average of the calculation results of the hole diameters to the gas pressure controller 24. The measuring unit 23 outputs the movement average, the maximum value and the minimum value of the hole diameter of the optical fiber 40*a* to an external display or an electronic chart. The display or electronic chart displays the movement average, the maximum value and the minimum value of the hole diameter of the optical fiber 40*a*. A measurement frequency of the hole diameter of the optical fiber 40*a* in the measuring unit 23 is, for example, five times per second in the case of the area sensor. A calculation frequency of the movement average of the hole diameter is, for example, one time every 1 to 30 seconds. The recognition of the outline, the recognition of the contour line of the hole, and the calculation of the hole diameter are realized by known techniques. For example, the recognition of the outline and the recognition of contour line of the hole are realized by drawing a line at a place at which there is a difference in brightness in the image.

The gas pressure controller 24 controls a pressure of the gas introduced into the through holes 33 by the gas pressure application device 11*a* based on a measurement result of the measuring unit 23. Specifically, the gas pressure controller 24 adjusts the pressure of the gas introduced into the through holes 33 in the gas pressure application device 11*a* so that a measured value of the hole diameter of the optical fiber 40*a* is within a predetermined numerical range. As an example, the gas pressure controller 24 first acquires from the measuring unit 23 the movement average of the measured values of the hole diameter of the optical fiber 40*a*. The gas pressure controller 24 controls the gas pressure in the gas pressure application device 11*a* so that the movement average is within a predetermined numerical range. For example, the gas pressure controller 24 increases the gas pressure in the gas pressure application device 11*a* when the movement average is smaller than the predetermined numerical range. The gas pressure controller 24 reduces the gas pressure in the gas pressure application device 11*a* when the movement average is greater than the predetermined numerical range. The predetermined numerical range may be a preset value, for example, 1.0 µm or more and 10.0 µm or less. Since there is a time difference (delay) between the adjustment of the gas pressure in the gas pressure application device 11*a* and the change in the hole diameter, the gas pressure is controlled by PID control, for example. Thus, the hole diameter is automatically matched to a target value with high accuracy over the entire length of the optical fiber 40, and the optical fiber 40 with excellent optical characteristics is obtained.

(Method of Manufacturing Optical Fiber)

Figure 4:
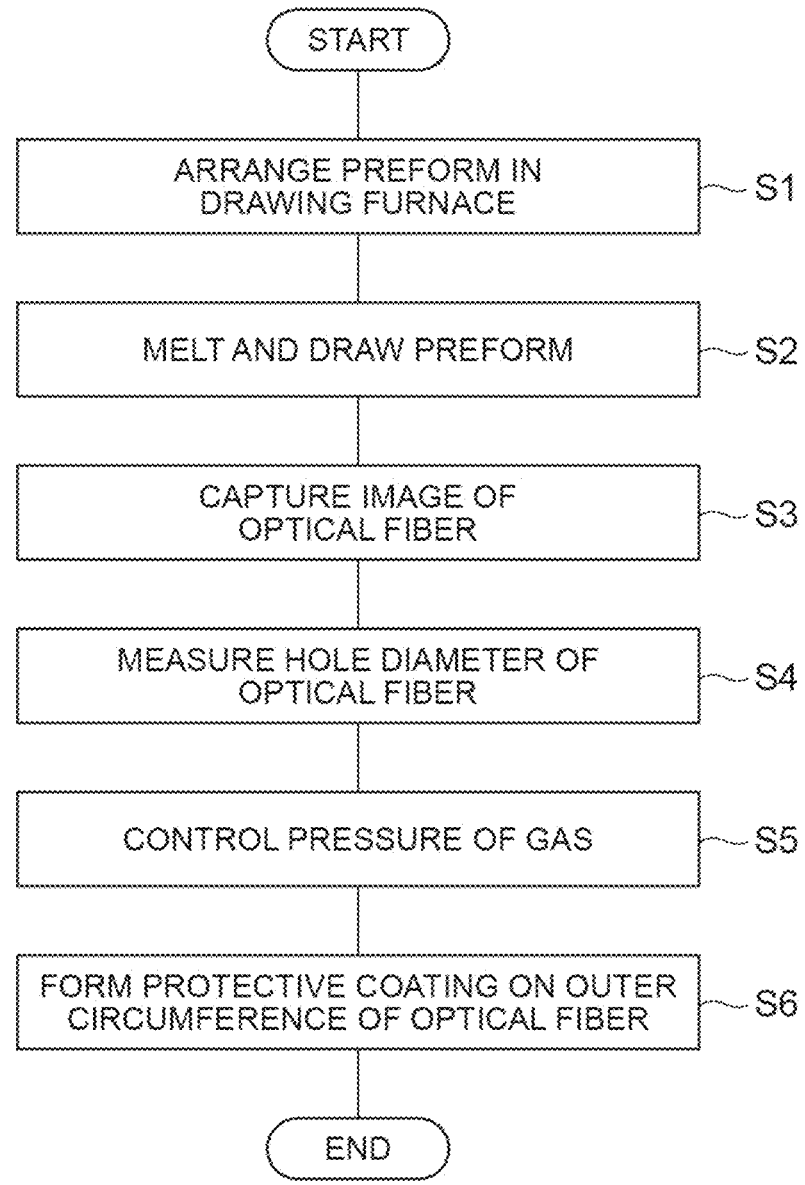
FIG. 4 is a flowchart showing the method of manufacturing an optical fiber according to one embodiment.

FIG. 4 is a flowchart showing a method of manufacturing the optical fiber 40. A method of manufacturing the optical fiber 40 with the holes 43 from the preform 30 having the through holes 33 described above will be described below with reference to FIG. 4.

First, the preform 30 is gripped by the gripping mechanism 11 of the drawing apparatus 10, and the distal end portion 30*b* of the preform 30 is disposed in the drawing furnace 12 (Step S1). The preform 30 is melted and drawn in the drawing furnace 12 while a gas is introduced into the through holes 33 by the gas pressure application device 11*a* (Step S2). Specifically, first, the preform 30 is disposed on the gripping mechanism 11. Next, while the gas is introduced into the through holes 33, the distal end portion 30*b* of the preform 30 is inserted into the drawing furnace 12 to heat the distal end portion 30*b* of the preform 30. Then, when the distal end portion 30*b* of the preform 30 is sufficiently heated and melted, the glass fiber-like optical fiber 40*a* is pulled out of the distal end portion 30*b*. Subsequently, the glass fiber-like optical fiber 40*a* pulled out is kept warm in the heat retaining furnace 13. Thus, the structure of the glass is relaxed. The method of manufacturing an optical fiber may not have the heat-retaining step. When the glass structure of the optical fiber 40*a* is relaxed by heat retention, the outer diameter of the optical fiber 40*a* is measured by the measuring device 14, and the optical fiber 40*a* is cooled by the cooler 15.

Subsequently, an image of the optical fiber 40*a* drawn from the preform 30 is captured by the image capturing device 50 (Step S3). In this image capturing process, when the optical fiber 40*a* deviates, a predetermined countermeasure is taken to make the image clearer, and the image is maintained in a clear state.

For example, in the above-described image capturing process, the optical fiber 40*a* deviates in units of several hours, which may cause the camera 53 to be out of focus on the optical fiber 40*a*, and thus the image obtained by the image capturing device 50 is unclear. In other words, the image capturing device 50 may not be able to maintain the image in the clear state. In this case, the stage controller 56 focuses the camera 53 on the optical fiber 40*a*. More specifically, when the drawing of the preform 30 is started, the stage controller 56 moves the stage 52 to focus the camera 53 on the stage 52 on the optical fiber 40*a*. Then, while the preform 30 is being drawn, the stage controller 56 keeps the camera 53 focused on the position of the optical fiber 40*a* by maintaining the separation distance between the position of the optical fiber 40*a* and the position of the camera 53.

Further, for example, in the image capturing process, it is conceivable that the optical fiber 40*a* deviates due to the vibration of the optical fiber 40*a* during the drawing of the preform 30, and thus the image obtained by the image capturing device 50 becomes unclear. Therefore, in the manufacturing method, the vibration of the optical fiber 40*a* is curbed by arranging the image capturing device 50 directly above the die 16. The illuminator 54 may irradiate the optical fiber 40 with illumination for a predetermined period of time, and the camera 53 may capture an image of the optical fiber 40*a* at the timing of the irradiation. Such an image capturing method can also make the image acquired by the image capturing device 50 clearer.

Subsequently, the measuring unit 23 measures the hole diameter of the optical fiber 40*a* based on the image acquired from the image capturing device 50 (Step S4). The gas pressure controller 24 controls the pressure of the gas introduced into the through holes 33 by the gas pressure application device 11a based on the measurement result of the hole diameter (Step S5). Specifically, the measuring unit 23 calculates the hole diameter of the optical fiber 40a based on the image acquired from the image capturing device 50. The measuring unit 23 calculates the movement average of 10 most recent calculation results of the hole diameter, and outputs the movement average to the gas pressure controller 24. The gas pressure controller 24 adjusts the pressure of the gas introduced into the through hole 33 in the gas pressure application device 11a so that the measured value of the hole diameter of the optical fiber 40a is within a predetermined numerical range.

Subsequently, a protective coating is formed on the outer circumference of the optical fiber 40a (Step S6). Specifically, a coating layer is applied to the glass fiber-type optical fiber 40a by the die 16. The coating layer is UV-cured by the UV irradiator 17. Thus, an optical fiber 40b coated with a resin is formed. Then, the optical fiber 40b on which the coating layer is formed is wound up by the winder 21 through the direct-type guide roller 18 and the capstan 19. Thus, the optical fiber 40 is manufactured.

The effects of the method for manufacturing an optical fiber according to the present embodiment will be described below. When an optical fiber with holes is drawn from a preform having through holes, the hole diameter of the optical fiber may change over time even when the drawing is performed under the same conditions. Therefore, in a comparative example for the present embodiment, a part of the optical fiber manufactured in advance is extracted, and the hole diameter of the part is measured outside the drawing apparatus (on the offline). Then, an operator adjusts the pressure of the gas introduced into the through holes of the preform based on the measured hole diameter and the operator's own experience. However, in the above comparative example, real-time measurement of the hole diameter and adjustment of the pressure of the gas introduced into the through holes based on the measurement results cannot be performed in real time in parallel with the drawing of the preform. Therefore, since the pressure of the gas cannot be adjusted until a part of the optical fiber manufactured in advance is extracted and the measurement of the hole diameter is completed, an yield of the drawing apparatus is lowered. Even when the gas pressure can be adjusted, the hole diameter of the drawn optical fiber cannot be measured in real time, and thus it cannot be determined whether the hole diameter is within a target numerical range. Therefore, the yield in the drawing apparatus is lowered.

On the other hand, when it is attempted to measure the hole diameter of the drawn optical fiber in real time, the image obtained by capturing the optical fiber may become unclear due to the deviation of the optical fiber. For example, a strain in the draw machine occurs and thus the deviation of the optical fiber occurs due to a temperature change in the draw machine and a change in a weight of the preform during drawing. As a result, the optical fiber is out of focus of the camera that captures an image of the optical fiber, and the optical fiber is captured to be blurred (out of focus) in the image. Further, for example, since the optical fiber during the drawing vibrates, the optical fiber is captured to be vibrated in the image. When the image is vibrated in this way, it is impossible to continuously and directly measure the hole diameter of the optical fiber with high accuracy.

In contrast to the above comparative example, in the method of manufacturing the optical fiber according to the present embodiment, when the image becomes unclear due to the deviation of the optical fiber 40, a predetermined countermeasure is taken to make the image clear. According to such a manufacturing method, even when the optical fiber 40 deviates in an image obtained by capturing the optical fiber 40, out-of-focus, vibration, and the like, which cause the image to become unclear, are curbed. Therefore, the image of the optical fiber 40 can be kept clear. As a result, it is possible to continuously and directly measure the hole diameter of the optical fiber 40 with high accuracy based on the image. The hole diameter of the optical fiber 40 can be measured in real time, and the hole diameter of the optical fiber 40 can be adjusted within the target numerical range without delay.

In the method of manufacturing an optical fiber according to the present embodiment, in the image capturing process, a predetermined countermeasure when the optical fiber 40 deviates may be taken by keeping the position of the optical fiber 40 in focus. In this case, when the optical fiber 40 is continuously manufactured for a long time and the optical fiber 40 deviates from the focus of the camera used for image capturing, it is possible to curb the optical fiber being captured to be blurred due to the deviation of the optical fiber. As a result, it is possible to curb the occurrence of out-of-focus, which causes the image to become unclear, in the captured image.

Figure 5:
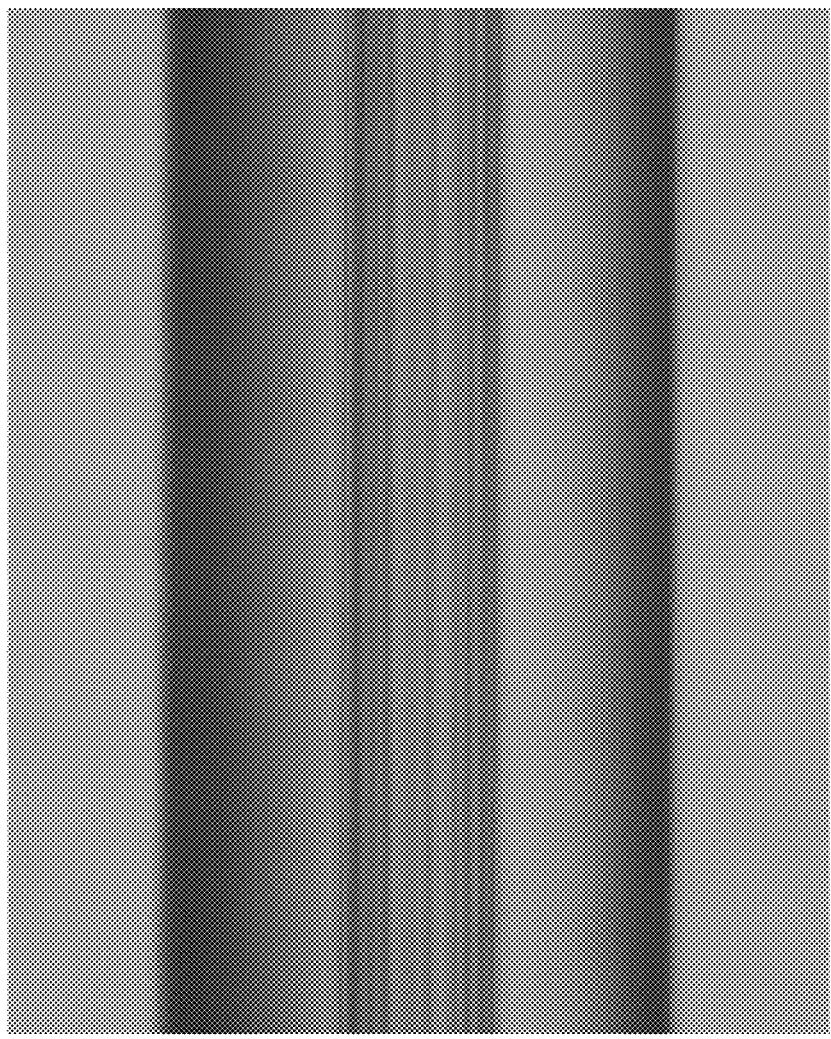
FIG. 5 is an example of an image captured by the image capturing device of FIG. 3.
Figure 6:
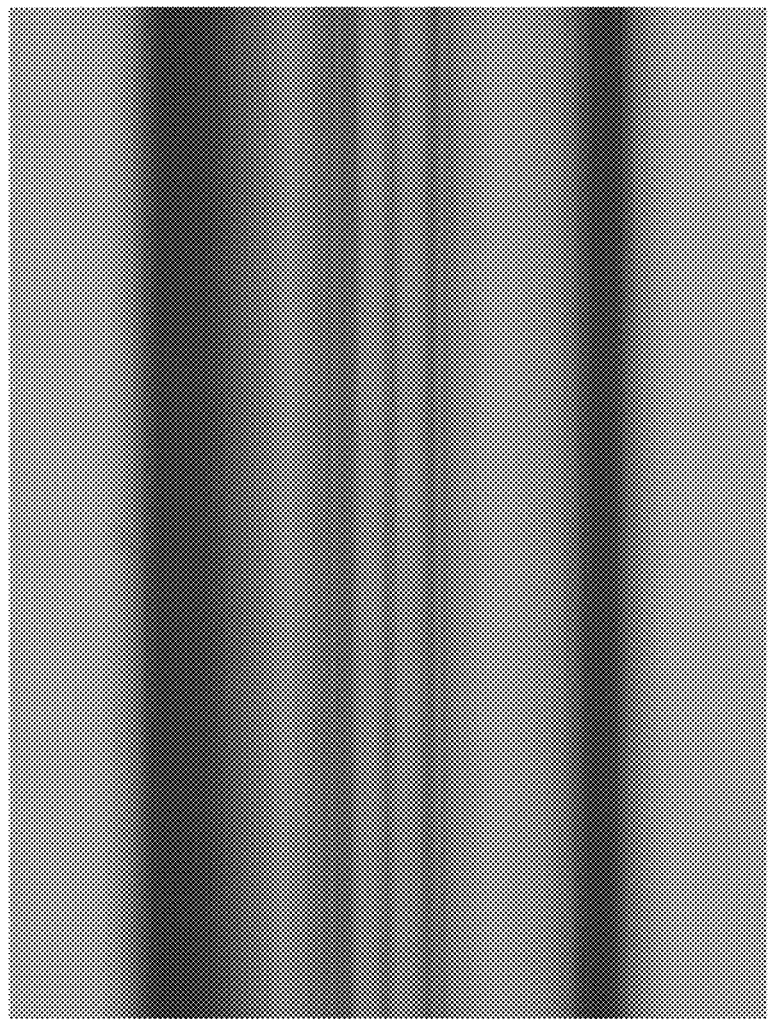
FIG. 6 is an example of an image captured by the image capturing device of FIG. 3.
Figure 7:
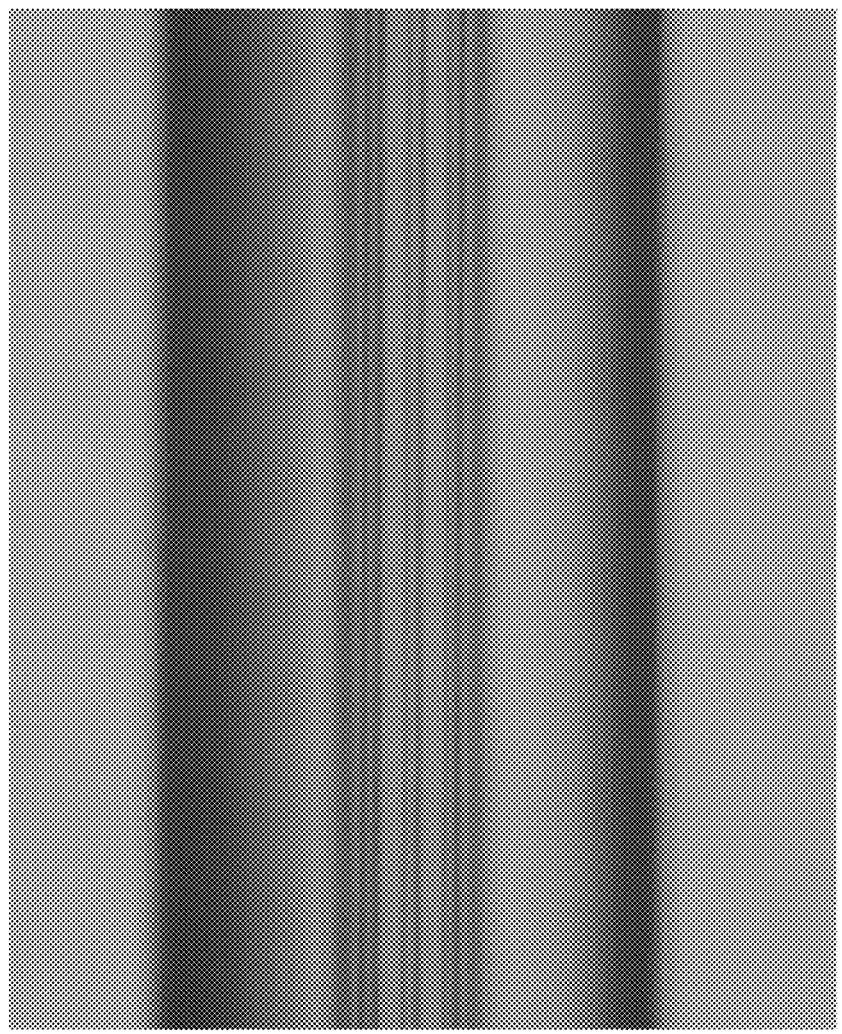
FIG. 7 is an example of an image captured by the image capturing device of FIG. 3.

FIG. 5 is a captured image when the optical fiber 40 deviates from the focal position of the camera 53 by 10 μm to the camera 53 side. FIG. 6 is a captured image when the optical fiber 40 deviates from the focal position of the camera 53 by 10 μm to the side opposite to the camera 53. FIG. 7 is a captured image when the position of the optical fiber 40 coincides with the focal position of the camera 53. As shown in FIGS. 5 and 6, when the optical fiber 40 deviates by 5 μm or more, the image captured by the image capturing device 50 becomes unclear. In other words, an allowable amount of deviation of the optical fiber 40 is 5 μm or less. As shown in FIG. 7, by focusing on the position of the optical fiber 40, it is possible to curb the optical fiber being captured to be blurred due to the deviation of the optical fiber 40. That is, since the detector 55, the stage controller 56, and the stage 52 realize an autofocus mechanism, the optical fiber 40 is prevented from being out of focus due to the deviation of the optical fiber 40 over time.

In the method of manufacturing an optical fiber according to the present embodiment, a protective coating may be formed on the outer circumference of the optical fiber 40 immediately after image capturing. The image capturing may be performed in a region with a distance of 30 cm or less from a region in which the protective coating is formed, or may be performed in a region with a distance of 10 cm or less from the region in which the protective coating is formed. In this case, since the movement of the optical fiber 40 in the radial direction is restricted when the protective coating is formed immediately after image capturing, an image of the optical fiber 40 can be captured in a state in which the deviation of the optical fiber 40 in the image capturing process is curbed, for example, within a target value that is an amount of shift of 5 μm. Therefore, it is possible to curb the occurrence of vibration in the captured image, which causes the image to become unclear. For example, an image that is less affected by the vibration of the optical fiber 40 can be obtained by providing the optical head 51 of the image capturing device directly above the die 16. When the optical head 51 is disposed directly above the die 16, since a temperature in the image capturing range of the optical head 51 is 100° C. or less and heat haze is less likely to occur, a distortion due to the heat haze is curbed in the image captured by the image capturing device 50.

In the method of manufacturing an optical fiber according to the present embodiment, in the image capturing process, the optical fiber 40 may be irradiated with illumination for a predetermined period of time, and an image may be captured at the timing of the irradiation to take a predetermined countermeasure when the optical fiber 40 deviates. The predetermined period of time may be $5.0 \times 10^{-5}$ seconds or more and $1.0 \times 10^{-3}$ seconds or less. In this case, the illumination is emitted for a predetermined period of time and the image is captured at the timing of the irradiation. Therefore, when the camera 53 of the image capturing device 50 is exposed at high speed, it is possible to reduce the influence of the vibration of the optical fiber 40 in the captured image. As a result, it is possible to curb the influence of vibration, which causes the image to become unclear, in the captured image.

An apparatus for manufacturing an optical fiber according to the present embodiment is a drawing apparatus 10 for manufacturing an optical fiber 40 with holes 43 from a preform 30 having through holes 33. The drawing apparatus 10 includes a drawing furnace 12 in which the preform 30 is disposed, a gas pressure application device 11a that injects a gas into the through holes 33 to apply a pressure, an image capturing device 50 that captures an image of the optical fiber 40, a measuring unit 23 that measures the hole diameter of the optical fiber 40 based on the image obtained by the image capturing device 50, and a gas pressure controller 24 that controls injection of the gas into the through holes 33 by the gas pressure application device 11a based on the measurement result of the measuring unit 23. The image capturing device 50 includes a mechanism that implements a predetermined countermeasure for making the image clear when the optical fiber 40 is located and maintains the image in the clear state.

In the apparatus for manufacturing an optical fiber, even when the optical fiber deviates, out-of-focus, vibration, and the like, which cause the image captured by the optical fiber 40 to become unclear, are curbed, and thus the image captured by the optical fiber 40 can be maintained in the clear state. As a result, it is possible to continuously and directly measure the hole diameter of the optical fiber 40 with high accuracy based on the image.

Although the embodiment according to the present disclosure have been described above in detail, the present disclosure is not limited to the above embodiment and can be applied to various embodiments. For example, in the above-described embodiment, in the image capturing process, one of the plurality of holes 43 may be captured from a plurality of directions. In this case, when the image of the optical fiber 40 is captured from a certain direction, even when the hole 43 overlaps the core 41 of the optical fiber 40 and an image thereof cannot be successfully captured, the image of the hole 43 can be captured in another direction. Thus, it becomes possible to continuously measure each of the hole diameters of the optical fiber 40 with higher accuracy. In order to capture the image of the optical fiber 40 in a plurality of directions, a plurality of optical heads 51 may be provided at regular intervals on a circumference around the optical fiber 40, or one optical head 51 may be configured to be rotatable around the optical fiber 40 as an axis.

In the above-described embodiment, although the gas pressure controller 24 controls the pressure of the gas introduced into the through holes 33 by the gas pressure application device 11a based on the measurement result of the hole diameter of the optical fiber 40, control of the pressure of the gas may be performed manually.

Although the measuring unit 23 is included in the control device 20 in the above embodiment, the present disclosure is not limited thereto. For example, measuring unit 23 may be included in the image sensor controller 57.

In the above-described embodiment, the stage controller 56 is provided to focus the camera 53 on the optical fiber 40, but the present disclosure is not limited thereto. For example, focusing before and during drawing of the preform 30 may be performed manually by an operator. For example, when whether or not the movement average of the hole diameter of the optical fiber 40 is within a target numerical range is determined by the measuring unit 23 and a frequency of the movement average deviating from the above numerical range increases in the determination result, the operator may perform the focusing.

In the above-described embodiment, the case in which a known device is used as the device for drawing the preform 30 is exemplified, but the present disclosure is not limited thereto. For example, a mechanism (a pressure vessel) for pressurizing the optical fiber 40 may be provided in a device for drawing the preform 30 to draw the preform 30 having a composition described above in the radial direction.

What is claimed is:

1. A method of manufacturing an optical fiber with a hole from a preform having a through hole, comprising:
   placing the preform in a drawing furnace;
   forming an optical fiber by melting and drawing the preform in the drawing furnace while a gas is introduced into the through hole;
   capturing an image of the optical fiber drawn from the preform; and
   measuring a hole diameter of the optical fiber based on an image captured in the image capturing and controlling a pressure of the gas introduced into the through hole based on a measurement result,
   wherein, in the capturing of the image, when the optical fiber deviates, continuing to focus on the position of the optical fiber is taken as a predetermined countermeasure to make the image clear, and the image is maintained in a clear state.

2. The method of manufacturing an optical fiber according to claim 1, wherein, in the capturing of the image, the predetermined countermeasure when the optical fiber deviates is taken by moving a camera to a change in the position of the optical fiber, so that the camera continues to focus on the position of the optical fiber.

3. The method of manufacturing an optical fiber according to claim 1, further comprising forming a protective coating on an outer circumference of the optical fiber immediately after the capturing of the image.

4. The method of manufacturing an optical fiber according to claim 1, wherein, in the capturing of the image, a predetermined countermeasure when the optical fiber deviates is taken by irradiating the optical fiber with illumination for a predetermined period of time and capturing the image at a timing of irradiation.

5. The method of manufacturing an optical fiber according to claim 4, wherein the predetermined period of time is $5.0 \times 10^{-5}$ seconds or more and $1.0 \times 10^{-3}$ seconds or less.

6. The method of manufacturing an optical fiber according to claim 1, wherein the hole in the optical fiber includes a plurality of holes, and in the capturing of the image, one of the plurality of holes is captured in a plurality of directions.

7. An apparatus for manufacturing an optical fiber with a hole from a preform having a through hole, comprising:

a drawing furnace configured to place the preform;

an application device configured to apply a pressure by introducing a gas into the through hole;

an image capturing device configured to capture an image of the optical fiber;

a measuring unit configured to measure a hole diameter of the optical fiber based on the image captured by the image capturing device; and a controller configured to control a pressure of the gas introduced into the through hole by the application device, based on a measurement result of the measuring unit, wherein the image capturing device includes a mechanism that takes continuing to focus on the position of the optical fiber as a predetermined countermeasure to make the image clear and maintains the image in a clear state, when the optical fiber deviates.

8. The apparatus for manufacturing an optical fiber according to claim 7, wherein, the mechanism takes the predetermined countermeasure when the optical fiber deviates by moving a camera to a change in the position of the optical fiber, so that the camera continues to focus on the position of the optical fiber.

* * * * *